Patented Apr. 12, 1949

2,466,871

UNITED STATES PATENT OFFICE 2,466,871

METHOD FOR IMPROVING THE ADSORPTION OF CARBON DISULFIDE CONTAINED IN GASEOUS MIXTURES INCIDENT TO THE MANUFACTURE OF RAYON

Herman Leendert Van Nouhuys, Breda, Netherlands, assignor to American Enka Corporation, Enka, N. C., a corporation of Delaware No Drawing. Application August 8, 1946, Serial No. 689,194. In the Netherlands August 24, 1945

5 Claims. (Cl. 18—54)

The present invention relates to a method for the recovery of the carbon disulphide content of gaseous mixtures and more particularly to the recovery of carbon disulphide by the adsorption method as a part of the process of producing viscose rayon and the like.

During the manufacture of viscose rayon and the like, cellulose is reacted with alkali to form alkali cellulose. The alkali cellulose is aged to the desired extent and it is then converted into cellulose xanthate by mixing it with carbon disulphide, which cellulose xanthate is then dissolved in a dilute caustic solution. The solution is filtered and permitted to age, after which it is extruded through a spinneret into an acid coagulating bath. During the spinning period the viscose solution is decomposed and carbon disulphide, together with impurities such as hydrogen sulphide and other substances, is liberated. A small portion of the carbon disulphide and a large portion of the hydrogen sulphide pass into the air at this point in the process while a large proportion of the carbon disulphide is retained within the rayon filaments.

In the discontinuous or interrupted process such filaments are collected in package form and the packages are subjected to after-treatment. The packages are subjected to washing by the pressure or vacuum treatment or by a combination thereof and the carbon disulphide, admixed with air and impurities, is removed at this stage. In the manufacture of viscose rayon by the continuous spinning method the carbon disulphide carried in the filaments is removed in admixture with air together with impurities as the yarn is being liquid treated.

Since carbon disulphide is used in large quantities in the production of rayon and the like and since it constitutes a material factor in the ultimate cost of production of the rayon, the recovery of this carbon disulphide has been considered to be an important step in the viscose process. It being thus desirable to recover the carbon disulphide at all stages in which it is liberated during the process, it is necessary that the recovery be efficient if it is to be economically feasible. However, prior to the adsorption step, when the mixture, which is contaminated with hydrogen sulphide and other substances, is previously passed through a washing tower containing a caustic solution or water in order to liberate the carbon disulphide-air mixture from the contaminations, the gas mixture, as a result of the washing operation, is saturated to a large extent with water vapor.

It has now been determined by tests that the degree of adsorption of carbon disulphide by the adsorbent material depends on the moisture content of the carbon disulphide-air mixture, e. g., if the gas mixture is substantially saturated with moisture then the adsorption of the carbon disulphide is very low, whereas if a substantial portion of the moisture is removed, the adsorption of carbon disulphide is high.

This invention therefore, has as an object the conditioning of carbon disulphide whereby a high recovery may be had over a relatively long period of use of an adsorption material.

Another object of the present invention is to provide a method of removing or lowering the moisture content of the carbon disulphide-air mixture prior to its passage through the adsorbing apparatus.

It is a specific object of the present invention to utilize concentrated sulphuric acid for removal of moisture from a mixture of air and carbon disulphide liberated during the manufacture of viscose rayon and the utilization of the thus diluted sulphuric acid for the replenishing of the spin bath in the same operation.

This is an extremely expedient way of lowering the moisture content of the carbon disulphide-air mixture because concentrated sulphuric acid is always available in large quantities in rayon plants as it is the principal ingredient employed in the coagulating baths for the viscose rayon. When the carbon disulphide-air mixture is washed with concentrated acid and the acid thereby diluted to, for example, 50%, it can still be applied as a correction to the spin bath. In this way, the sulphuric acid can serve two purposes, namely, improving the adsorption of carbon disulphide by lowering its moisture content, and as correction additions to the spin baths for maintaining a constant acid concentration therein.

As a practical proposition, it is desirable to use sulphuric acid as the desiccant, although the removal of the moisture may be effected in several other ways, e. g., by cooling the gas mixture sufficiently to condense the water or by passing the mixture over a desiccant such as silica gel.

In proceeding according to one form of the present invention, a carbon disulphide-air mixture which had been washed and dried with concentrated sulphuric acid and contained about 10 grams of carbon disulphide per cubic meter, was passed through a layer of activated carbon 160 cm. in height, at a speed of about 30 cm. per second. By comparison, about one and one-half times as much carbon disulphide was adsorbed before it commenced to pass through the adsorbent as a result of saturation of the activated carbon, than was adsorbed when using a carbon disulphide-air mixture which was substantially saturated with moisture.

It has been determined that when passing a moisture containing carbon disulphide-air mixture through an adsorbing apparatus having short columns of packing material, more carbon disulphide was adsorbed during the initial stages than in the latter stages. For example, in one case, 8.5% of carbon disulphide was adsorbed in one-half hour whereas only 4.3% was adsorbed after five hours. This can be explained by the fact that the dry adsorbent material in the beginning takes up the carbon disulphide in larger quantities than the water vapor but as the adsorption proceeds, more and more water vapor is gradually adsorbed until some of the carbon disulphide already adsorbed is partially displaced by the water vapor.

In tests where the adsorption was carried through to a state of equilibrium, it was found that it was not essential to completely dry the carbon disulphide-air mixture. As a matter of fact, for all practical purposes, it was preferable to only dry to about 60% relative humidity because further drying increased the adsorption only slightly whereas the cost of further drying was materially increased. Specifically, when drying a carbon disulphide-air mixture to a relative moisture of 60%, the adsorption of carbon disulphide after five hours amounted to 15% as compared with 18% adsorption from a dry mixture. The mixture saturated with water was adsorbed only 4.3% in five hours.

What is claimed is:

1. A method for improving the adsorption of the carbon disulphide in a carbon disulphide-air mixture which comprises lowering the moisture content of the mixture to at least 60% relative humidity prior to passage through an adsorbing zone.

2. A method according to claim 1 in which the moisture content of the carbon disulphide-air mixture is lowered by means of washing the same with concentrated sulphuric acid.

3. A method according to claim 1 in which the moisture content of the carbon disulphide-air mixture is lowered by means of passing the same over silica gel.

4. A method according to claim 1 in which the moisture content of the carbon disulphide-air mixture is lowered by means of cooling the mixture sufficiently to condense the water vapor and then restoring the original temperature to effect a relative humidity of at least 60%.

5. Incident to the manufacture of viscose rayon wherein a spin bath containing sulphuric acid is employed, the steps of utilizing concentrated sulphuric acid to wash carbon disulphide-air mixtures to lower the moisture content of the mixtures to at least 60% relative humidity and thereby improve the adsorption of the carbon disulphide, and utilizing the resulting diluted sulphuric acid as additions in the acid corrections of the said spin bath.

HERMAN LEENDERT VAN NOUHUYS.

REFERENCES CITED

The following references are of record in the file of this patent:

UNITED STATES PATENTS

| Number | Name | Date |
| --- | --- | --- |
| Re. 20,079 | Moritz et al. | Aug. 25, 1933 |

OTHER REFERENCES

Rayon Textile Monthly, June 1939, pp. 55-56. (Copy in Div. 15.)